(12) United States Patent
Singer et al.

(10) Patent No.: US 8,326,099 B2
(45) Date of Patent: Dec. 4, 2012

(54) OPTICAL FIBER COUPLER ARRAY

(75) Inventors: Jonathan Singer, New Hope, PA (US);
Victor Il'ich Kopp, Fair Lawn, NJ (US);
Daniel Neugroschl, Suffern, NY (US)

(73) Assignee: Chiral Photonics, Inc., Pine Brook, NJ (US)

( * ) Notice: Subject to any disclaimer, the term of this patent is extended or adjusted under 35 U.S.C. 154(b) by 0 days.

(21) Appl. No.: 12/502,613

(22) Filed: Jul. 14, 2009

(65) Prior Publication Data

US 2010/0008624 A1 Jan. 14, 2010

Related U.S. Application Data

(60) Provisional application No. 61/080,684, filed on Jul. 14, 2008.

(51) Int. Cl.
*G02B 6/26* (2006.01)
*G02B 6/04* (2006.01)

(52) U.S. Cl. ............... 385/43; 385/115; 385/28; 385/29

(58) Field of Classification Search .................... 385/43, 385/28–29
See application file for complete search history.

(56) References Cited

U.S. PATENT DOCUMENTS

| | | | | |
|---|---|---|---|---|
| 4,076,378 A | * | 2/1978 | Cole | 385/115 |
| 4,360,248 A | * | 11/1982 | Bickel et al. | 385/46 |
| 4,763,976 A | * | 8/1988 | Nolan et al. | 385/43 |
| 5,371,826 A | * | 12/1994 | Friedman | 385/115 |
| 6,208,788 B1 | * | 3/2001 | Nosov | 385/121 |
| 6,330,382 B1 | * | 12/2001 | Harshbarger et al. | 385/28 |
| 2007/0237453 A1 | * | 10/2007 | Nielsen et al. | 385/28 |
| 2008/0209952 A1 | * | 9/2008 | Tremblay | 65/402 |

* cited by examiner

*Primary Examiner* — Uyen Chau N Le
*Assistant Examiner* — Chris H Chu
(74) *Attorney, Agent, or Firm* — Edward Etkin, Esq.

(57) ABSTRACT

An optical fiber coupler array capable of providing multiple low loss, high coupling coefficient interfaces between a predetermined number of low numerical aperture optical fibers and an optical waveguide device with at least a corresponding number of waveguide interfaces. The novel coupler array includes a plurality of coupler inner cores and a plurality of corresponding coupler outer cores, within a medium surrounding each plural outer core, and also includes a first end for interfacing with plural optical fibers and a second end for interfacing with a plurality of waveguide interfaces of an optical waveguide device. The sizes of the inner and outer cores are gradually reduced from the first end to the second end in accordance with at least one predetermined reduction profile. Various parameters, such as refractive indices and sizes of the inner and outer cores and the medium (as well as the reduction profile) are selected to produce a plurality of low numerical aperture waveguides at the first end, and a plurality of high numerical aperture waveguides at the second end, while advantageously minimizing insertion loss and maximizing the coupling coefficient at each end. Advantageously, the novel coupler array may be fabricated as an array of individually drawn couplers from multiple parallel fused performs (arranged in a row, or in another geometric cross section). Alternately, the novel coupler array may be fabricated from a single perform (glass or polymer) embedded with a plurality of parallel inner and outer core sets.

6 Claims, 3 Drawing Sheets

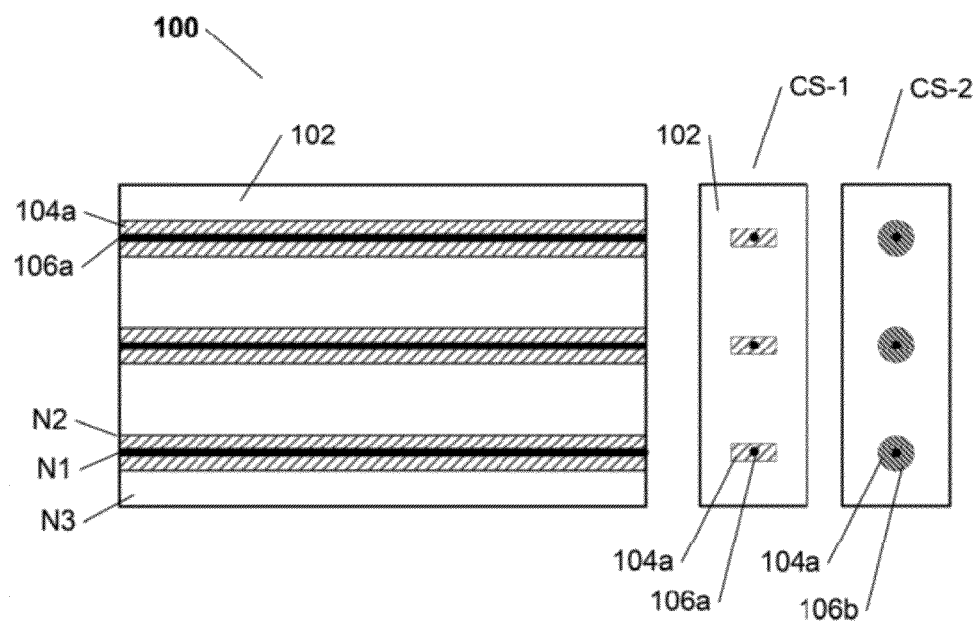

OPTICAL FIBER COUPLER ARRAY

CROSS REFERENCE TO RELATED APPLICATIONS

The present patent application claims priority from the commonly assigned co-pending U.S. provisional patent application Ser. No. 61/080,684, entitled "Optical Fiber Coupler Array", filed Jul. 14, 2008.

FIELD OF THE INVENTION

The present invention relates generally to couplers, and more particularly to an optical fiber device comprising an array of multiple optical fiber couplers capable of providing multiple low loss, high coupling coefficient interfaces between a predetermined number of low numerical aperture optical fibers and an optical waveguide device with at least a corresponding number of waveguide interfaces.

BACKGROUND OF THE INVENTION

Optical waveguide devices are indispensable in various high technology industrial applications, and especially in telecommunications. In recent years, these devices, including planar waveguides, and two or three dimensional photonic crystals are being used increasingly in conjunction with conventional optical fibers. In particular, optical waveguide devices based on chiral optical fibers are advantageous and desirable in applications in which conventional optical fibers are also utilized. However, there are significant challenges in interfacing optical waveguide devices, including chiral optical fiber devices, with conventional low index contrast optical fibers. Typically, at least two major obstacles must be dealt with: (1) the difference between the diameters of the optical waveguide device and the conventional fiber (especially with respect to the differences in core sizes), and (2) the difference between the numerical apertures of the optical waveguide device and the conventional fiber. Failure to properly address these obstacles results in increased insertion losses and a decreased coupling coefficient at each interface.

A commonly assigned U.S. Pat. No. 7,308,173, entitled "OPTICAL FIBER COUPLER WITH LOW LOSS AND HIGH COUPLING COEFFICIENT AND METHOD OF FABRICATION THEREOF", which is hereby incorporated herein in its entirety, advantageously addressed all of the above issues by providing various embodiments of a novel optical fiber coupler capable of providing a low loss, high coupling coefficient interface between conventional optical fibers and optical waveguide devices.

Nevertheless, a number of challenges still remain. With the proliferation of optical devices with multiple waveguide interfaces (e.g., waveguide arrays), establishing low loss high-accuracy connections to arrays of high numerical aperture waveguides often provide problematic, especially because the spacing between the waveguides was very small making coupling thereto all the more difficult.

It would thus be desirable to provide an optical fiber coupler array that provides a high coupling coefficient interface with high accuracy and easy alignment between an optical waveguide device having a plurality of high numerical aperture waveguide interfaces, and a plurality of optical fibers each having low numerical apertures.

BRIEF DESCRIPTION OF THE DRAWINGS

In the drawings, wherein like reference characters denote corresponding or similar elements throughout the various figures:

FIG. 3 shows schematic diagrams of a side view, and of alternate cross-sectional views, of a first embodiment of an optical fiber coupler array perform that may be utilized to fabricate the inventive optical fiber coupler array of FIGS. 1A and 1B.

SUMMARY OF THE INVENTION

The present invention is directed to an optical fiber coupler array capable of providing multiple low loss, high coupling coefficient interfaces between a predetermined number of low numerical aperture optical fibers, and an optical waveguide device with at least a corresponding number of waveguide interfaces. The novel coupler array includes a plurality of coupler inner cores and a plurality of corresponding coupler outer cores, within a medium surrounding each plural outer core, and also includes a first end for interfacing with plural optical fibers and a second end for interfacing with a plurality of waveguide interfaces of an optical waveguide device. The sizes of the inner and outer cores are gradually reduced from the first end to the second end in accordance with at least one predetermined reduction profile. Various parameters, such as refractive indices and sizes of the inner and outer cores and the medium (as well as the reduction profile), are preferably selected, in accordance with the present invention, to produce a plurality of low numerical aperture waveguides at the first end, and to produce a plurality of high numerical aperture waveguides at the second end, while advantageously minimizing insertion loss and maximizing the coupling coefficient at each end. Advantageously, the inventive coupler array may be fabricated as an array of individually drawn couplers from multiple parallel fused performs (arranged in a row, or in another geometric cross section).

Alternately, in another embodiment of the present invention, the novel coupler array may be fabricated from a single perform (glass or polymer), embedded with a plurality of parallel inner and outer core sets.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

DETAILED DESCRIPTION OF THE PREFERRED EMBODIMENTS

The present invention is directed to an optical fiber coupler array capable of providing multiple low loss, high coupling coefficient interfaces between a predetermined number of low numerical aperture optical fibers and an optical waveguide device with at least a corresponding number of high numerical aperture waveguide interfaces.

Figure 1A:
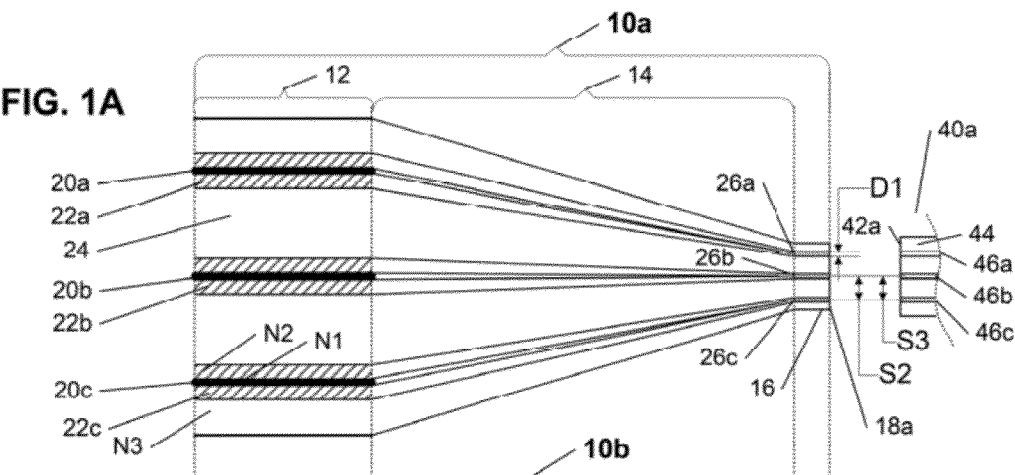
FIG. 1A is a schematic diagram of a side view of a first exemplary embodiment of the optical fiber coupler array of the present invention.

Referring now to FIG. 1A, a first exemplary embodiment of an optical fiber coupler array of the present invention is shown as a coupler array 10a. The novel coupler array 10a includes a plurality of coupler inner cores (20a-20c) of a first refractive index N1, and a plurality of corresponding coupler outer cores (22a-22c) of a second refractive index N2, within a medium 24 surrounding each plural outer core 22a-22c, of a third refractive index N3. Preferably, the refractive indexes are selected in accordance with the following relationship:

N1>N2>N3

At the outset it should be noted, that while various drawing figures show three or more inner/outer core sets in the array, the coupler array of the present invention may include any number of two or more inner and outer core sets, selected as a matter of design choice without departing from the spirit of the invention.

The novel coupler array 10a also includes a first end/section 12 (between A and B, which can be much smaller than is shown in FIG. 1A) for interfacing with plural optical fibers and a second end/section 16 (between C and D) for interfacing with a plurality of waveguide interfaces 46a-46c of an optical waveguide device 40a. The sizes of the inner and outer cores 20a-20c, and 22a-22c, respectively, are gradually reduced from the position B at the first end 12 to position C at the second end 16, in accordance with at least one predetermined reduction profile.

Preferably, various parameters, such as refractive indices N1-N3, and sizes of the inner and outer cores 20a-20c, and 22a-22c, respectively, and the medium (as well as the at least one predetermined reduction profile) are selected to produce a plurality of low numerical aperture waveguides at the first end 12 (at position B), and a plurality of high numerical aperture waveguides 26a to 26c) at the second end 16, while advantageously minimizing insertion loss and maximizing the coupling coefficient at each end.

Advantageously, the spacings S2 between the plural high numerical aperture waveguides at an interface surface 18a at position D of the array 10a, is smaller than the spacings S1 between the inner/outer core sets at position A of the first end 12, thus providing a dense interconnect interface for plural high numerical aperture waveguides interfaces 46a to 46c with spacings S3 therebetween that preferably substantially matches the magnitude of S2.

Figure 1B:
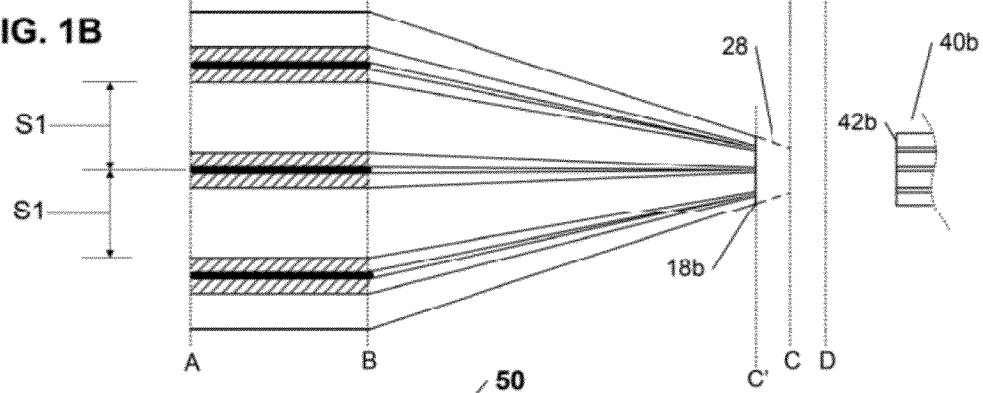
FIG. 1B is a schematic diagram of a side view of a an alternate embodiment of the inventive optical fiber coupler array of FIG. 1A.

In an alternate embodiment of the coupler array 10a of FIG. 1A, a coupler array 10b is shown in FIG. 1B. In certain applications, requiring very high precision, it is possible that the small interface portion at second end 16 of array 10a may have spacings S2 and/or waveguide 26a-26c diameters D1 that do not sufficiently match the corresponding parameters at an interface 42b of a waveguide 40b. In this case, it may be advantageous to fabricate the array 10a in a manner such that the interface parameters S2 and D1 are smaller than corresponding parameters at interface 42b, and then remove small portions of the second end 16 and if necessary continue beyond, toward position B (e.g., by polishing) until an interface 18b with desired parameters is produced at position C'.

Figure 2:
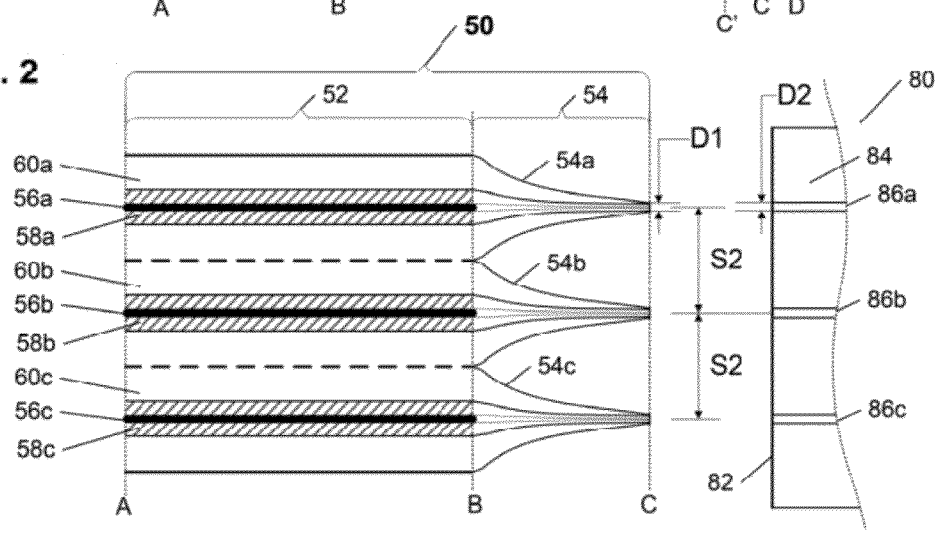
FIG. 2 shows a schematic diagram of a side view of a second exemplary embodiment of the optical fiber coupler array of the present invention.

FIG. 2 shows a schematic diagram of a side view of a second exemplary embodiment of the optical fiber coupler array 50 of the present invention, in which the novel coupler array has been fabricated as an array 54 of individually drawn couplers 54a to 54c from multiple parallel fused performs (arranged in a row, or in another geometric cross section). Each coupler portion includes an inner and outer core set 56a-56c, and 58a-58c respectively, with each set being surrounded by a corresponding medium section 60a to 60c. The coupler array 50 may be useful for connection to waveguide devices, such as device 80, with a reasonably large interface 82 and spacings S2 between waveguide interface elements 86a-86c that are of sufficient size to match the spacings of corresponding waveguide 50 high numerical aperture interfaces of couplers 54a to 54c at position C. As previously noted, the diameters D1 of the interfaces of couplers 54a to 54c at position C, are preferably selected to match diameters D2 of the waveguide interface elements 86a-86c.

Referring now to FIG. 3, a first embodiment of an optical fiber coupler array perform that may be utilized to fabricate the inventive optical fiber coupler array 10a, 10b of FIGS. 1A and 1B is shown, with plural inner cores 106a and outer cores 104a embedded in parallel within a single perform medium 102 (made from glass or polymer for example). By way of example, if the resulting optical coupler array is intended to be polarization maintaining, then, as is shown in cross section view CS-1, the outer cores 104a may have 180 degree cross-sectional symmetry (e.g. a rectangle cross-section). Otherwise as shown in view CS-2, the outer cores 104a may be conventional.

Figure 4A:
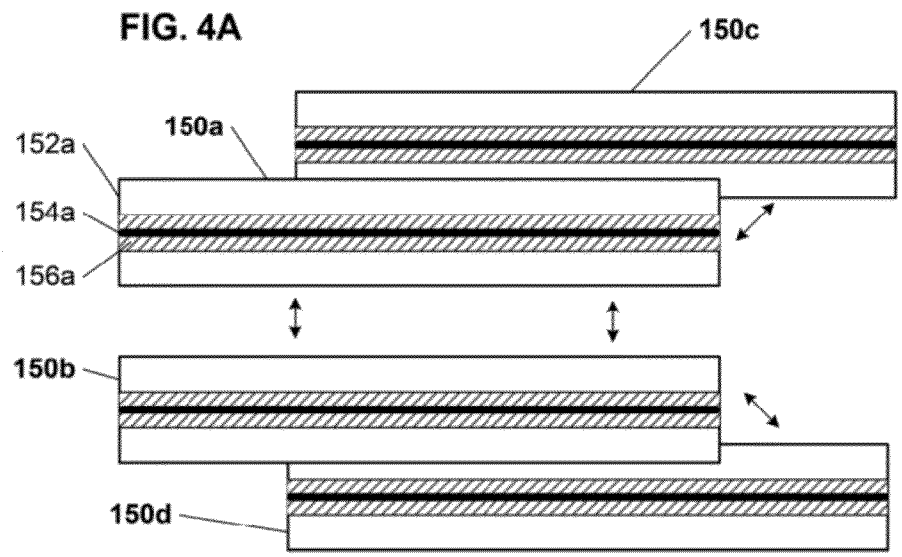
FIGS. 4A and 4B, show schematic diagrams of side views, and of an exemplary cross-sectional view, of a second embodiment of an optical fiber coupler array perform, and of a stage of initial preparation thereof, that may be utilized to fabricate the inventive optical fiber coupler array of FIG. 2.
Figure 4B:
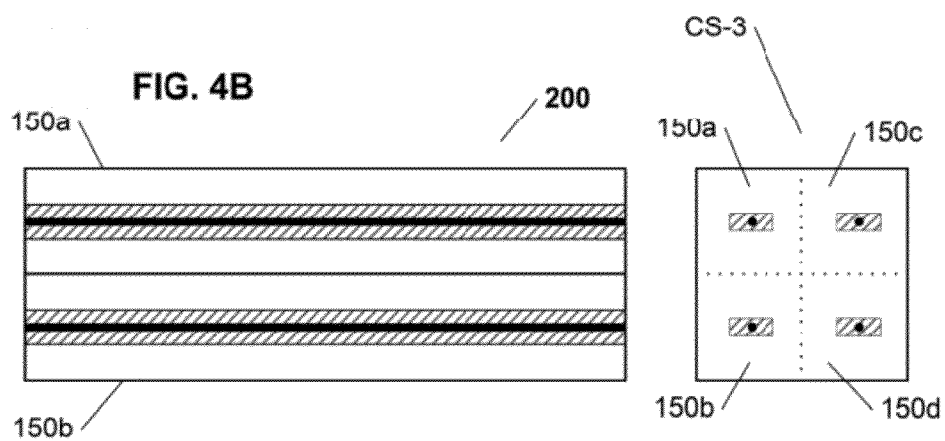

Referring now to FIGS. 4A and 4B, a second embodiment of an exemplary optical fiber coupler array perform 100 that may be utilized to fabricate the inventive optical fiber coupler array 50 of FIG. 2 is shown. FIG. 4A shows a stage of initial preparation thereof, wherein a set of performs 150a-150d, each comprising an inner core 154a, and an outer core 156a surrounded by a medium 152a, are connected to one another in parallel to each (for example by being fused together). FIG. 4B, then shows a ready for use perform 200 comprising the four performs 150a-150d in a square cross-section configuration, which by way of further example is shown, in view CS-3, as having a square cross-section with polarization maintaining outer cores 156a. As noted above, this exemplary perform 200 may be used to fabricate an embodiment of the inventive coupler array which comprises a plurality of individually drawn high numerical aperture waveguide couplers (such as coupler array 50 of FIG. 2).

Thus, while there have been shown and described and pointed out fundamental novel features of the invention as applied to preferred embodiments thereof, it will be understood that various omissions and substitutions and changes in the form and details of the devices and methods illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

We claim:

1. An optical coupler array for use with an optical waveguide device, having a plurality of individual independent waveguides each positioned at a predetermined spacing from one another, each having a capacity for at least one optical mode of a predetermined mode field profile, comprising:
   an elongated optical fiber element having a first end and a second end, and comprising:
   a plurality of separate coupler inner cores, each having a first refractive index, a first inner core size at said first end, and a second inner core size at said second end,
   a plurality of separate coupler outer cores, each longitudinally surrounding a corresponding said plural coupler inner core, each embedded in a common single housing structure, and each having a second refractive index, a first outer core size at said first end and a second outer core size at said second end, said second inner core and second outer core sizes being substantially smaller than said first inner core and first outer core sizes, respectively, and said common single coupler housing structure comprising a medium having a third refractive index surrounding all said plural coupler outer cores, wherein said first refractive index is greater than said second refractive index, wherein said second refractive index is greater than said third refractive index, wherein a total volume of said medium of said common single coupler housing structure, is greater than a total volume of said plural separate coupler inner cores and said plural separate outer cores that are embedded in said common single coupler housing structure. and wherein:

said each said first inner core size, each said first outer core size, and spacing between said separate coupler outer cores, are simultaneously and gradually reduced, in accordance with a predetermined reduction profile, between said first end and said second end along said optical fiber element, until said second inner core size and said second outer core size are reached for each respective said plural coupler inner core and said plural outer core, wherein each said second inner core size is selected to he insufficient to guide light, each said second outer core size is selected to match the said predetermined mode field profile of the at least one optical mode of the plural waveguides, such that light traveling from said first end to said second end escapes from each said plural coupler inner core into each said corresponding plural coupler outer core proximal to said second end, and light traveling from said second end to said first end moves from each said plural coupler outer core into each said corresponding plural coupler inner core proximal to said first end, so that said first end forms a plurality of substantially identical numerical aperture waveguide first ends, having a first spacing between each proximal plural waveguide first end, and said second end forms a plurality of substantially identical numerical aperture waveguide second ends, having a second spacing between each proximal plural waveguide second end, wherein said second spacing, is smaller than said first spacing.

2. The optical coupler array of claim 1, wherein said predetermined reduction profile comprises a plurality of predetermined reduction profiles that vary from one another.

3. The optical coupler array of claim 2, wherein plural predetermined reduction profiles that vary from one another in accordance with a relative position of each set of said plural inner and outer cores from a center said optical fiber element.

4. The optical coupler array of claim 1, wherein said medium of said single coupler housing structure is composed of one of: a glass or a polymer.

5. The optical coupler array of claim 1, wherein said elongated optical fiber element is fabricated from a single preform comprising said medium, embedded with a plurality of sets of corresponding inner and outer cores, each plural set being positioned in parallel to one another.

6. The optical coupler array of claim 5, wherein said plural sets of corresponding inner and Outer cores arc positioned and arranged in at least one row.

* * * * *